United States Patent
Vogel et al.

(10) Patent No.: US 8,267,557 B2
(45) Date of Patent: Sep. 18, 2012

(54) ILLUMINATION SYSTEM FOR PASSENGER CABIN ILLUMINATION

(75) Inventors: Carsten Vogel, Hamburg (DE); Detlef Heym, Achim (DE); Tilo Budinger, Hamburg (DE); Stefan Schulz, Himmelpforten (DE)

(73) Assignee: Airbus Operation GmbH (DE)

( * ) Notice: Subject to any disclaimer, the term of this patent is extended or adjusted under 35 U.S.C. 154(b) by 1267 days.

(21) Appl. No.: 12/012,239

(22) Filed: Jan. 31, 2008

(65) Prior Publication Data

US 2008/0186721 A1    Aug. 7, 2008

Related U.S. Application Data

(60) Provisional application No. 60/898,650, filed on Jan. 31, 2007.

(30) Foreign Application Priority Data

Jan. 31, 2007    (DE) .......................... 10 2007 004 829

(51) Int. Cl.
*F21V 21/05* (2006.01)
(52) U.S. Cl. .......................... 362/471; 362/477; 362/484
(58) Field of Classification Search .................. 315/291, 315/294, 297, 307, 312; 362/471, 477, 484
See application file for complete search history.

(56) References Cited

U.S. PATENT DOCUMENTS

| | | | | |
|---|---|---|---|---|
| 5,347,434 A * | 9/1994 | Drake | .......................... | 362/472 |
| 6,158,882 A * | 12/2000 | Bischoff, Jr. | .................. | 362/488 |
| 7,135,664 B2 * | 11/2006 | Vornsand et al. | ............. | 250/205 |
| 7,731,399 B2 * | 6/2010 | Kessler et al. | ................ | 362/471 |
| 2005/0116667 A1 * | 6/2005 | Mueller et al. | ................ | 315/312 |
| 2005/0237754 A1 | 10/2005 | Klettke | | |
| 2007/0145915 A1 * | 6/2007 | Roberge et al. | ............... | 315/312 |

FOREIGN PATENT DOCUMENTS

| | | |
|---|---|---|
| DE | 102005024449 | 9/2006 |
| DE | 202006006636 U | 10/2006 |
| FR | 2743866 | 7/1997 |

* cited by examiner

*Primary Examiner* — Tung X Le
(74) *Attorney, Agent, or Firm* — Lerner, David, Littenberg, Krumholz & Mentlik, LLP

(57) ABSTRACT

A light module, a light-module carrier and an illumination system for an aircraft, which allow intelligent illumination and at the same time easy reconfiguration of cabin illumination. The light module provides information relating to its characteristics, while a control system determines a position of the light module on a light-module carrier, and on the basis of the determined position and of the characteristics of the light module adjusts the light module by way of a bus system of the light-module carrier according to a desired illumination.

7 Claims, 4 Drawing Sheets

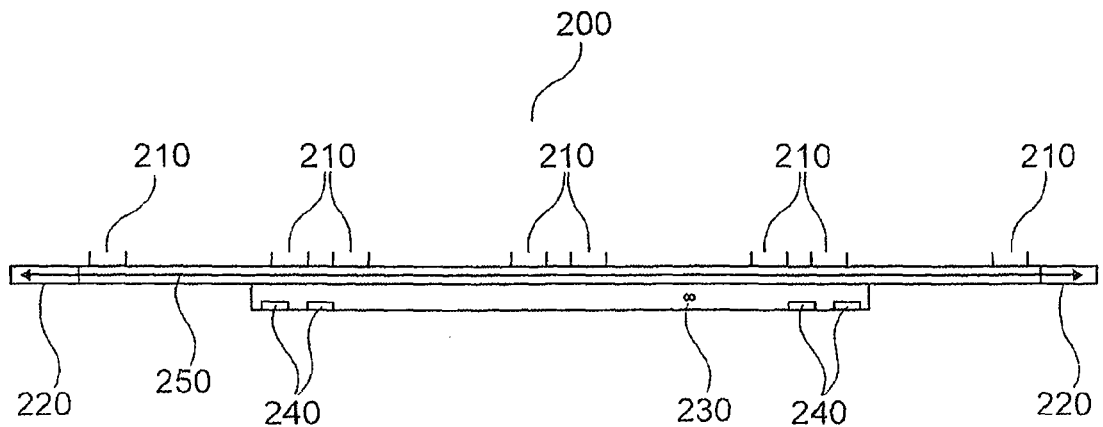
Fig. 4
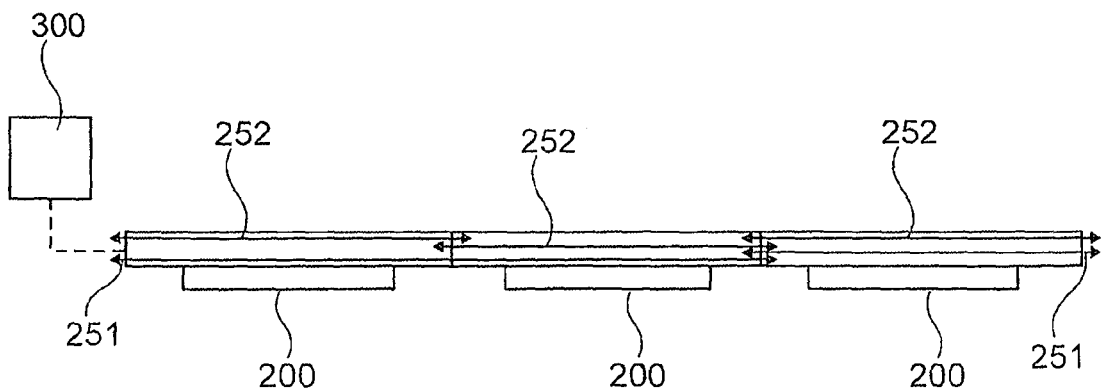
Fig. 5
Fig. 6

ILLUMINATION SYSTEM FOR PASSENGER CABIN ILLUMINATION

CROSS-REFERENCE TO RELATED APPLICATIONS

This application claims the benefit of the filing date of U.S. Provisional Patent Application No. 60/898,650 filed Jan. 31, 2007, the disclosure of which is hereby incorporated herein by reference.

BACKGROUND OF THE INVENTION

The present invention relates to an illumination system for passenger cabin illumination, and in particular to a light module, a light-module carrier and an illumination system, as well as to an associated method for intelligent illumination so that easy reconfiguring of cabin illumination may become possible.

General illumination hitherto used in a passenger cabin of an aircraft, and in particular of an aeroplane, has been implemented by devices in which there are a data bus interface, the control electronics and the illumination means themselves. These devices come in particular lengths and with a particular functional extent (white only, white plus a color, white plus a color mixing system). In these arrangements, brightness levels and colors may only be controlled along the entire length of a lighting unit.

The installed lighting units together with their respective positions and the functional extent are deposited in a configuration file in the control computer. Control is by way of a central control computer. The light device itself is connected to the computer by way of corresponding transducer boxes. In this arrangement each light device has its own connection to the transducer.

The design of lighting units in use today may make it possible only to a limited extent to implement a color-/brightness gradient along the length of the cabin because gradation along the length of the lighting unit may be predetermined. As a result of the lighting unit type being determined in the configuration in the control computer, the use of some other lighting unit type at some position is always associated with a change of this file. For example, if the first lighting unit is changed in accordance with requirements related to the number of passengers, and if in that position some other type of light device is installed that differs from that of the adjoining class, then this type of light device has to be adjusted accordingly. In the case of different types of light in the different classes the flexibility of the cabin design may be limited by the length of the light devices, provided the functional extent of the light is correspondingly to agree precisely with the cabin layout.

SUMMARY OF THE INVENTION

According to an exemplary embodiment of the invention, a light module for an illumination system for an aircraft is provided, wherein the light module comprises at least one illumination element and at least one interface for connection to a light-module carrier, wherein the light module is designed to provide information relating to the characteristics of the light module by way of at least one interface, and the at least one illumination element is controllable, by way of the interface, on the basis of the provided characteristics of the light module.

In this way the corresponding light module may communicate information relating to its characteristics, for example relating to the type of the installed illumination elements, by way of an interface, so that on the basis of this information control of the corresponding light module may take place. Since this information may no longer need to be deposited with a central control computer, it may be easily possible to exchange the light modules for light modules with other characteristics, and in doing so at the same time make possible targeted control of the light modules without a malfunction due to incorrectly installed light modules being possible, which light modules, for example, do not match the information deposited in the control computer.

Thus, a flexibly configurable linear lighting system may be provided that makes possible easy configurability and intelligent cabin illumination.

According to an exemplary embodiment of the invention, the information relating to the characteristics of the light module comprises information from the group comprising: number of the illumination elements, position of the individual illumination elements, and color or color composition of the individual illumination elements.

In this way it may be possible, by way of an interface, to inform the control system about the number of illumination elements present in the light module, the position of these individual illumination elements, and the color or color composition of each individual one of these illumination elements. In this context the term "color" or "color composition" refers not only to various color temperatures of the white light (warm white light, cold white light, daylight) but also to different colors, for example the red-green-blue system. In this arrangement the color composition is, however, not limited to the red-green-blue system but instead may comprise any other color system, for example including color systems that comprise more than three discrete colors.

According to an exemplary embodiment of the invention, the illumination elements are controllable according to their positions such that in each case they generate a light of a desired color range from their entire color range.

In this document the term "color range" refers to both the frequency spectrum and to the intensity of the color, i.e. within the spectrum to the frequency or wavelength and to the intensity, so that due to the control it may also be possible to generate partial color ranges of a possible entire color range.

According to an exemplary embodiment of the invention, the light module comprises a control unit that is designed to control illumination elements according to their positions such that in each case they generate light of a desired color range from their entire color range.

By providing a dedicated control unit in the light module, part of the control output may be provided by the central control system to a decentralised control unit of the light module, in particular if this involves control tasks that are specifically for the light module or that permit a major control effort that needs to be provided, for example, only for some individual light modules, so that such a control output does not have to be provided in a central control unit.

According to an exemplary embodiment of the invention, the light module is designed to communicate bidirectionally with the light-module carrier by way of the interface.

In this way information may be transmitted both from the light module to the light-module carrier and from the light-module carrier to the light module. This can, for example, be sensible in a case where it is not only the characteristics of the light module but also the changes in the light module, for example the failure of individual illumination elements, that are communicated. By means of such information, for example the central control unit may make a note so that the failure of individual illumination elements can, in a targeted manner and quickly, be rectified at the next opportunity by an exchange of modules.

According to an exemplary embodiment of the invention, the illumination elements are composed of the following group of colors or of the following color composition: warm white, cold white, daylight white, red, green, blue, or a combination thereof.

In this way, by means of a corresponding color setting, the mood in the cabin may be set, for example depending on the time of day, the flight phase, the carrier operator or the destination.

According to an exemplary embodiment of the invention, the length of the light modules is less than 10 inches, in particular approximately 5 inches or less.

In this way the pitch dimension of a cabin configuration may be selected comparatively flexibly in relation to the illumination sections, for example if a divider between the different classes has to be moved so that in the case of different illumination units in the different classes there is no associated overlap beyond the class divider.

According to an exemplary embodiment of the invention, a light-module carrier for an illumination system for an aircraft is provided, wherein the light module carrier comprises: at least one bus system that is indirectly or directly connectable to a central control unit, and a multitude of light-module interfaces that are designed such that an interface of a light module according to the invention is connectable to them.

In this way a light-module carrier may be provided that can reach along extended sections of a cabin and can serve as a carrier for the light modules, wherein by means of the light-module interfaces provided on the light-module carrier the light modules, by way of their interface, can communicate with the light-module carrier and in particular with its bus system. In this way the light-module carrier may no longer be tied to the illumination sections in a passenger cabin, but instead can project beyond the illumination sections because the light modules installed on said light-module carrier define the smallest illumination unit and thus also the smallest controllable illumination section.

According to an exemplary embodiment of the invention, the light-module carrier comprises at least one interface that is connectable to an associated interface of a further light-module carrier.

In this way it may be possible to link several light-module carriers together so that the bus system extends along the light-module carriers. A bus system may thus be installed more easily in a passenger cabin, and if required a defective light-module carrier may easily be exchanged.

According to an exemplary embodiment of the invention, the bus system is a bidirectional databus system.

Such a bidirectional databus system supports data exchange in both directions so that it may be possible both to transmit control information to the light modules by way of the light-module carrier or by way of the bus system, and to transmit information from the corresponding light module by way of the bus system, for example, to the central control unit. A databus system further may make it possible to address and transmit data without this requiring a controlled energy supply by way of the bus. In this arrangement it may be sufficient to essentially supply each module with supply energy, because controlling takes place by way of corresponding addressing.

According to an exemplary embodiment, the bus system comprises a redundant data bus.

In this way the function of the bus system may be ensured even in the case of partial failure of the bus line or in the case of interruption of the bus line. This can take place, for example, by way of a daisy chain connection between the carriers, which takes place in an alternating overlapping manner by way of the light-module carriers.

According to an exemplary embodiment of the invention, an illumination system for an aircraft is provided, comprising at least one light-module carrier according to the invention and a control device that is designed to control, by way of the bus system of the light-module carrier, a multitude of light modules according to the invention that are connectable to the light-module carrier by way of an interface, on the basis of information relating to characteristics of the corresponding light module.

Such an illumination system intelligently distributes the tasks among the control device or a central control computer, the light-module carriers and the light modules linked to them, so that great flexibility during any cabin reconfiguration may be made possible, and at the same time intelligent illumination of the passenger cabin may take place.

According to an exemplary embodiment of the invention, the control device is designed to control a multitude of light modules on the basis of a connection position of a light module.

By way of the information relating to the characteristics of the corresponding light module, and by way of the corresponding position, the control device receives the necessary information in order to, on the basis of a connection position of the light module, control the corresponding light module according to its characteristics. In this way great cabin illumination flexibility is achieved.

According to an exemplary embodiment of the invention, an aircraft with an illumination system according to the invention is provided.

According to an exemplary embodiment of the invention, a method is provided for controlling a multitude of light modules, comprising determining a position of a light module according to the invention on a light-module carrier, and controlling the light module on the basis of the determined position and of the predeterminable desired illumination at this position.

According to an exemplary embodiment of the invention, the determination takes place on the basis of information relating to the characteristics of the light module, which information is provided by way of an interface.

According to an exemplary embodiment of the invention, controlling takes place by way of a bus system of a light-module carrier according to the invention.

According to an exemplary embodiment of the invention, a program element is provided, which, when executed on a processor, implements the method according to the invention.

According to an exemplary embodiment of the invention, a computer-readable storage medium with a program element according to the invention, which program element is stored on said storage medium, is provided.

It should be pointed out that the exemplary embodiments of the invention described above and below also relate to the method, to the device, to the program element, and to the computer-readable medium.

The individual features of the various embodiments can, of course, also be combined.

These and other aspects of the present invention are clearly explained with reference to the embodiments described below.

BRIEF DESCRIPTION OF THE DRAWINGS

Exemplary embodiments of the invention are described below with reference to the following drawings:

FIG. 4 shows a light-module carrier according to an exemplary embodiment of the invention.

FIG. 5 shows different light modules according to different embodiments of the invention.

FIG. 6 shows an illumination system according to an exemplary embodiment of the invention.

DETAILED DESCRIPTION

Figure 1:
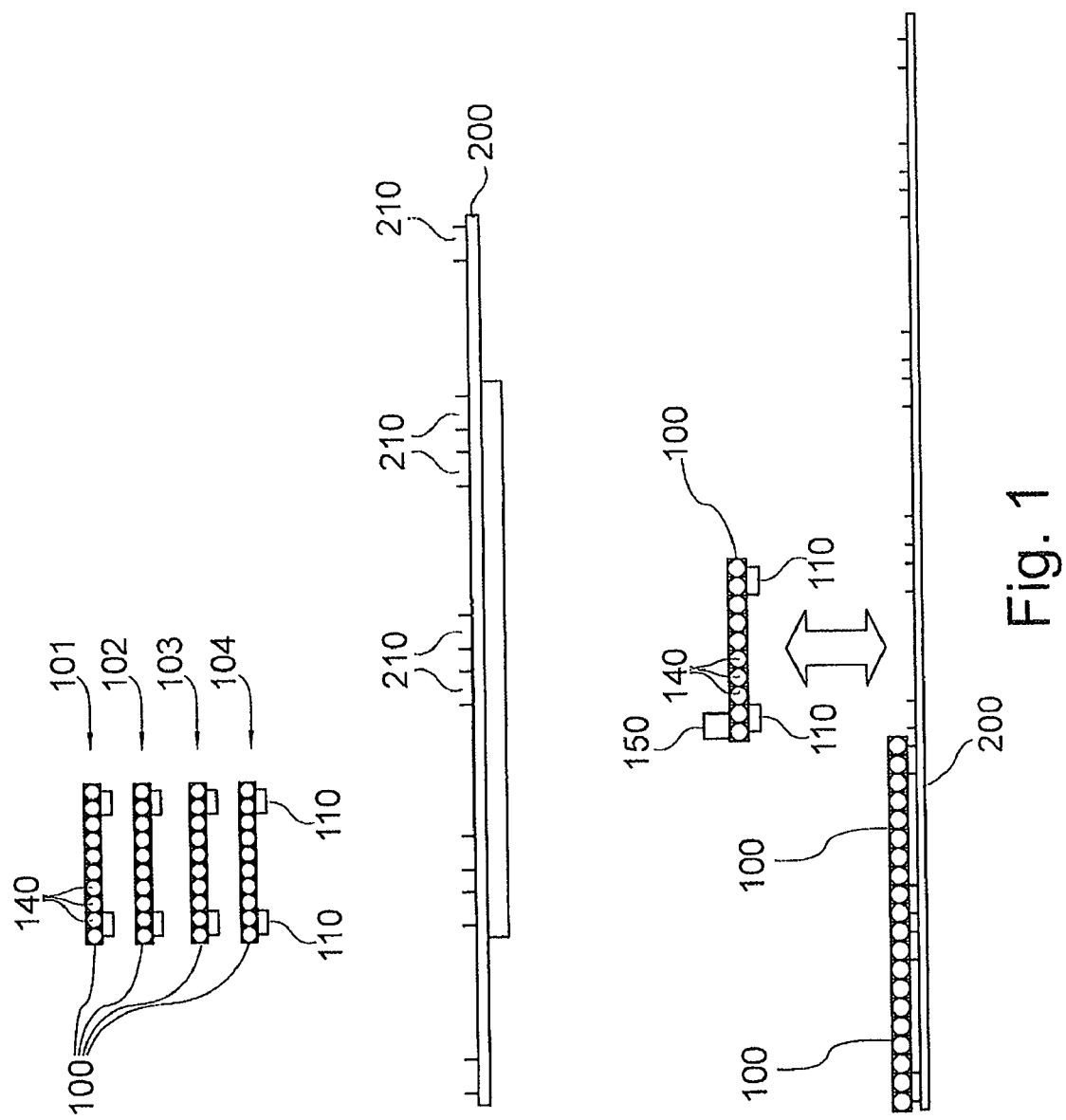
FIG. 1 shows a light-module carrier comprising light modules according to an exemplary embodiment of the invention.

FIG. 1 shows a light-module carrier 200 comprising a number of different light modules 100, 101, 102, 103, 104. In this arrangement the light modules 100 for an illumination system comprise at least one illumination element 140 and at least one interface 110 for connection to a light-module carrier 200, wherein the light module 100 is designed to provide information relating to the characteristics of the light module by way of at least one interface 110, wherein the illumination element 140 is controllable by way of the interface on the basis of the provided characteristics of the light module or of the illumination elements. The light-module carrier comprises a multitude of interfaces 210, wherein in each case at least one interface can be connected to at least one module 100. The interfaces can, of course, also be implemented in a mechanical attachment of the light modules on the light-module carrier 200. The light-module carrier is not limited to a particular number of holding positions for light modules but instead can accommodate any desired number of light modules. In this arrangement it is possible to place any desired light module 100 of the light modules 101, 102, 103 and 104 on any position of the light-module carrier 200. The light modules differ in that, for example, the light module 101 is a warm white light module, the light module 102 is a cold white light module, the light module 103 is a combination of a warm white and a cold white light module, and the module 104 is a color mixing system comprising a combination of color sources and white light sources. In the case of the combination, it is possible both to combine different illumination elements and to make a combination already within the illumination elements. It is not mandatory for the modules used in this arrangement to have the same length, instead they can differ in length, for example if the light-module carrier comprises interfaces at a regular pitch spacing of a pitch dimension so that the light modules can essentially have the length of any multiple of the pitch dimension.

In this arrangement, apart from comprising one or a multitude of illumination elements 140, a light module 100 can comprise a control unit 150 which, for example, carries out control tasks in a decentralised manner, in particular when controlling the light sources requires a particularly great control effort so that a central control unit does not have to be burdened with such control tasks.

Figure 2:
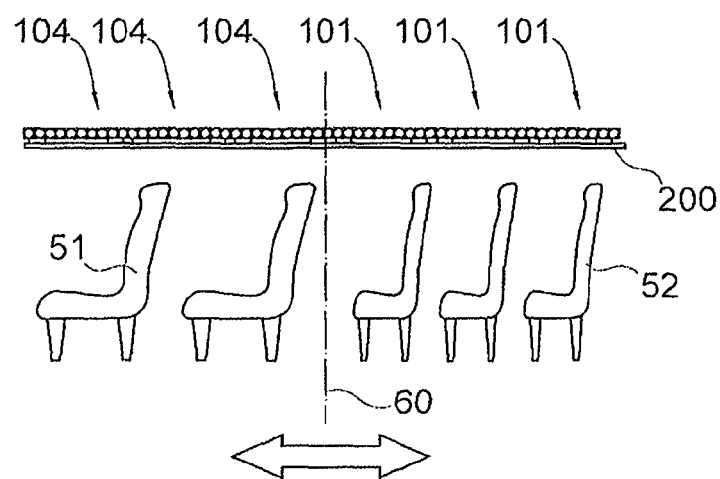
FIG. 2 shows a cabin configuration comprising a light-module carrier and light modules according to an exemplary embodiment of the invention.

FIG. 2 shows an exemplary configuration of a cabin in which different classes are to have different illumination. As a rule, the classes are divided by a class divider 60, wherein, for example, the seat pitch in a more expensive class, for example in business class 51, is greater than in a less expensive class, for example in economy class 52. In order to underline the difference in class not only by a class divider and in order to provide passengers paying more with a feeling of exclusivity, the illumination in a more expensive class is often designed so as to be more elaborate, for example comprising colored light in contrast to simple white light in less expensive classes. Since the class divider can be displaced depending on the number of passengers in a particular class, it may be sensible in such a case to also adjust the illumination correspondingly so that, for example, individual illumination modules 101, 104 on the light-module carrier 200 may be exchanged.

Figure 3:
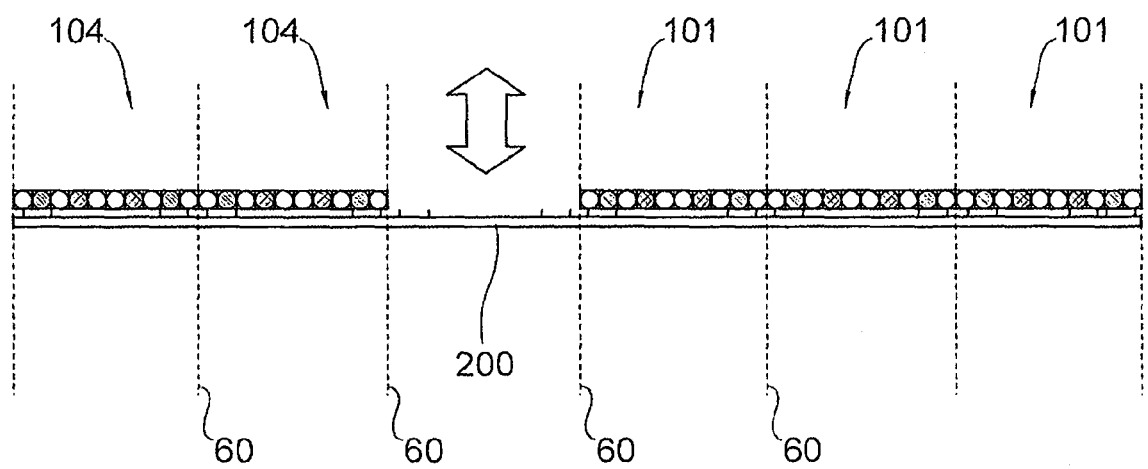
FIG. 3 shows a configuration of a light-module carrier with different light modules according to an exemplary embodiment of the invention.

FIG. 3 shows such a division comprising a pitch, wherein the pitch dimension marks the shortest spacing in which the illumination- or light modules 100 can be exchanged. It may make sense if the class divider 60 can also be displaced in this pitch dimension. For example, a light module can be removed from the light-module carrier 200 and can be exchanged by some other light module.

FIG. 4 shows an exemplary embodiment of a light-module carrier according to the present invention. In this arrangement the light-module carrier 200 comprises a multitude of light module interfaces that in the embodiment shown are arranged such that for each light-module two interfaces 210 are provided. However, it is also possible, for example, for only one interface 210 to be provided for each light module, and for the further attachment, for example, to be merely a mechanical holding device for the light module.

The light-module carrier furthermore comprises an interface 220, by means of which said light-module carrier can be connected to a corresponding interface of an adjacent light-module carrier, so that a continuous bus system 250 is created. In this arrangement each carrier can comprise an address 230 as well as a data interface 240 for the connection of subsystems.

Information concerning the characteristics of the modules can, for example, be obtained by coding, as shown in FIG. 5. In this arrangement, for example, the module 101, being a warm white module, comprises module code 000; the module 102, being a cold white light module, comprises the module code 001; the module 103, being a combination module, comprises the module code 101; and the module 104, being a color combination light-module, comprises the module code 100. It is understood that both the assignment of the module code can be varied as desired, and that any number of different modules can be used, wherein the number of the different modules is only limited by the length of the address word.

By means of such identification it may be possible to transmit not only the general characteristics of the module, but also to transmit any further information relating to the number of the illumination units provided, to the corresponding color and position of the illumination unit in the module, and to any further information to the extent that it is necessary for controlling the module.

On the basis of the corresponding initialisation, the carrier detects the type of module that is installed in particular slots. The light-module carrier 200 transmits this information to a control system 300. The information concerning the characteristics of the light module can be both invariable information, for example the type of module used, and variable information, for example a position of a defective illumination element.

FIG. 6 shows an exemplary embodiment of an illumination system for an aircraft, comprising one light-module carrier 200, or a multitude of light-module carriers 200 that are, for example, linked to each other by way of interfaces 220, and a control system 300 that handles control of the individual light modules (not shown in the drawing) arranged on the light-module carriers. Each light-module carrier comprises a databus 250 that can comprise a redundant databus, which in the embodiment shown is a daisy chain connection between the carriers 200. In this arrangement a first system 251 and a second system 252 are provided, wherein both the first and the second system are designed as a daisy chain connection between the carriers, wherein these parallel redundant daisy chain connections are designed so as to alternately cover two or more light-module carriers so that an alternating overlap of the daisy chain connection over the carrier interfaces occurs and in this way reliable linking of the light-module carriers takes place. In this arrangement the carriers can bidirectionally communicate with a central control system 300 by way of these connections, wherein the functionality can be varied by means of the various modules. As explained above, each carrier can accommodate various modules, wherein the modules can communicate bidirectionally with the carrier, and thus by way of the carrier, with the central control system 300.

Figure 7:
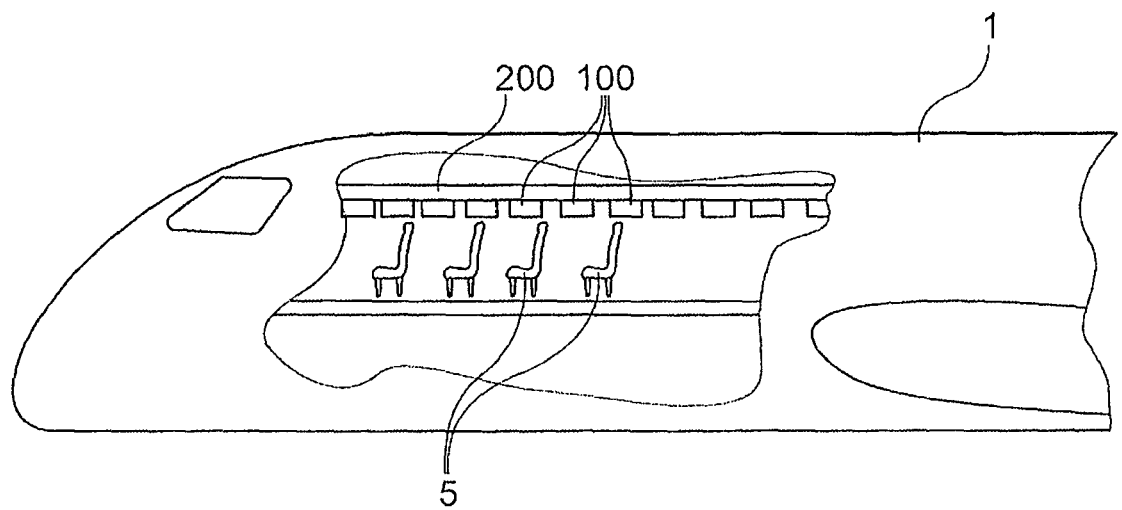
FIG. 7 shows an aircraft comprising an illumination system according to an exemplary embodiment of the invention.

FIG. 7 shows an exemplary embodiment of an aircraft, in particular of an aeroplane 1, comprising an illumination system according to the invention. In this arrangement, in a passenger cabin, in this embodiment above the seats 5, a light-module carrier 200 is provided on which there are a multitude of light modules 100. The light modules can be located both above the seats (illumination of a sidewall panel) and above the hatrack (illumination of a ceiling panel). Other installation positions are thus also imaginable. The diagram is of course not to scale, in particular since in relation to the seat dimensions the light modules 100 can be considerably shorter in order to allow cabin configurations that are as flexible as possible. In this arrangement the length of the light modules 100 is less than 10 inches, in particular 5 inches; in special cases it can be shorter still, for example 1 inch, so as to comprise the same pitch as, for example, a seat rail that is, for example, used for locking the seats. Such an illumination system can, of course, also be installed on or in the floor.

Figure 8:
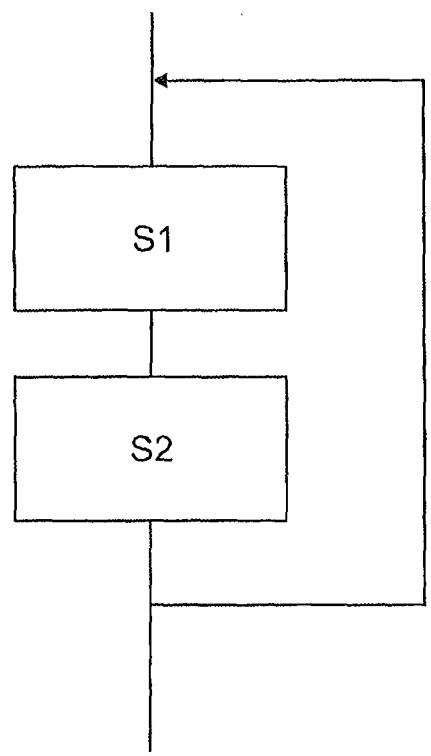
FIG. 8 shows a diagrammatic flow chart of the method according to an exemplary embodiment of the invention.

FIG. 8 is an exemplary view of a flow chart for an embodiment of the method according to the invention. In this arrangement, in a first method-related section S1 a position of a light module 100 on the light-module carrier 200 is determined. Furthermore, the information relating to the characteristics of the corresponding light module may also be read out. Subsequently, control S2 of the light module 100 takes place on the basis of the determined position, if required of the characteristics that have been read out, and of the predeterminable desired illumination at this position.

This procedure is iteratively repeated at intervals that are suitable to the respective case of application. This can, for example, take place at very short intervals, for example if monitoring the function of the illumination is also to take place so that the position is determined and errors are also determined. As an alternative, iteration may however also take place only after each start of operation following reconfiguration, in order to reduce the computing effort required from the central control unit.

It should be pointed out that this invention may not only be used for general illumination in passenger cabins in aircraft, but also in any other means of transport, for example in ships, trains or buses, and generally with any arrangement in which flexible configuration or equipment of an illumination system is necessary, Furthermore, it should be pointed out that the term "comprising" does not exclude other elements or method-related sections, and "a" or "one" does not exclude a plural number. Furthermore, it should be pointed out that reference characters in the claims should not be construed as being limiting, and that the scope of protection is defined by the claims.

The invention claimed is:

1. An illumination system for an aircraft, comprising:
    at least one light-module carrier comprising at least one bus system that is indirectly or directly connectable to a central control unit; and
    a plurality of light-module interfaces for connection to interfaces of a light module comprising:
    at least one illumination element; and
    at least one interface for connection to a light-module carrier;
    wherein the light module is configured to provide information relating to characteristics of the light module by way of the at least one interface, and, on the basis of the information relating to provided characteristics of the light module, the at least one illumination element is controllable by way of the interface; and
    a control device that is configured to control, by way of the bus system of the light-module carrier, a multitude of the light modules, which light modules are connectable to the light-module carrier by way of the at least one interface, on the basis of information relating to characteristics of the corresponding light module.

2. The illumination system of claim 1, wherein the control device is further configured to control the multitude of light modules on the basis of a connection position of a light module.

3. An aircraft comprising an illumination system, the illumination system comprising:
    at least one light-module carrier comprising at least one bus system that is indirectly or directly connectable to a central control unit; and
    a plurality of light-module interfaces for connection to interfaces of a light module comprising:
    at least one illumination element; and
    at least one interface for connection to a light-module carrier;
    wherein the light module is configured to provide information relating to characteristics of the light module by way of the at least one interface, and, on the basis of the information relating to provided characteristics of the light module, the at least one illumination element is controllable by way of the interface; and
    a control device configured to control, by way of the bus system of the light-module carrier, a multitude of the light modules, which light modules are connectable to the light-module carrier by way of the at least one interface, on the basis of information relating to characteristics of the corresponding light module.

4. A method for controlling a multitude of light modules, comprising:
    determining a position of a light module on a light-module carrier, the light module comprising at least one illumination element; and
    at least one interface for connection to a light-module carrier;
    wherein the light module is configured to provide information relating to characteristics of the light module by way of the at least one interface, on the basis of the information relating to provided characteristics of the light module, the at least one illumination element is controllable by way of the interface;
    wherein the light-module carrier comprises at least one bus system that is indirectly or directly connectable to a central control unit; and a plurality of light-module interfaces for connection to interfaces of a light module comprising:
at least one illumination element; and
at least one interface for connection to a light-module carrier;
wherein the light module is configured to provide information relating to characteristics of the light module by way of the at least one interface, and, on the basis of the information relating to provided characteristics of the light module, the at least one illumination element is controllable by way of the interface; and
controlling the light module on the basis of the determined position and of the predeterminable desired illumination at the determined position.

5. The method of claim 4, wherein the determining step takes place on the basis of information related to the characteristics of the light module, which information has been provided by way of the at least one interface.

6. The method of claim 4, wherein the controlling step takes place by way of a bus system of the light-module carrier.

7. A non-transitory computer-readable storage medium comprising instructions for causing a processor to:
determine a position of a light module on a light-module carrier, the light module comprising at least one illumination element; and
at least one interface for connection to a light-module carrier;
wherein the light module is configured to provide information relating to characteristics of the light module by way of at least one interface, and, on the basis of the information relating to provided characteristics of the light module, the at least one illumination element is controllable by way of the interface;
wherein the light-module carrier comprises at least one bus system that is indirectly or directly connectable to a central control unit; and
a plurality of light-module interfaces for connection to interfaces of a light module comprising:
at least one illumination element; and
at least one interface for connection to a light-module carrier;
wherein the light module is configured to provide information relating to characteristics of the light module by way of the at least one interface, and, on the basis of the information relating to provided characteristics of the light module, the at least one illumination element is controllable by way of the interface; and
control the light module on the basis of the determined position and of the predeterminable desired illumination at the determined position.

* * * * *